US009329255B2

(12) United States Patent
Larussi et al.

(10) Patent No.: US 9,329,255 B2
(45) Date of Patent: May 3, 2016

(54) IMAGING ANTENNA AND RELATED TECHNIQUES

(71) Applicant: Raytheon Company, Waltham, MA (US)

(72) Inventors: Amedeo Larussi, Oxnard, CA (US); Michael A. Gritz, Santa Barbara, CA (US); Jonathan P. Comeau, Winchester, MA (US)

(73) Assignee: Raytheon Company, Waltham, MA (US)

( * ) Notice: Subject to any disclaimer, the term of this patent is extended or adjusted under 35 U.S.C. 154(b) by 132 days.

(21) Appl. No.: 13/925,109

(22) Filed: Jun. 24, 2013

(65) Prior Publication Data

US 2014/0374616 A1 Dec. 25, 2014

(51) Int. Cl.

| | |
|---|---|
| ***G01S 1/70*** | (2006.01) |
| ***H01P 5/10*** | (2006.01) |
| ***H01P 9/00*** | (2006.01) |
| ***H01Q 9/28*** | (2006.01) |
| ***H01Q 11/10*** | (2006.01) |
| ***H01Q 21/06*** | (2006.01) |

(52) U.S. Cl.

CPC ... *G01S 1/70* (2013.01); *H01P 5/10* (2013.01); *H01P 9/006* (2013.01); *H01Q 9/285* (2013.01); *H01Q 11/105* (2013.01); *H01Q 21/062* (2013.01)

(58) Field of Classification Search

CPC ............. G01S 1/70; H01P 5/10; H01P 9/006; H01Q 9/285; H01Q 21/062

USPC .......................................................... 250/394

See application file for complete search history.

(56) References Cited

U.S. PATENT DOCUMENTS

| | | | | |
|---|---|---|---|---|
| 3,681,771 | A * | 8/1972 | Lewis et al. | 343/817 |
| 4,746,925 | A * | 5/1988 | Toriyama | 343/713 |
| 5,046,707 | A | 9/1991 | Allen | |
| 5,212,494 | A * | 5/1993 | Hofer et al. | 343/859 |
| 5,313,216 | A | 5/1994 | Wang et al. | |
| 5,365,203 | A | 11/1994 | Nakamura et al. | |
| 5,798,737 | A | 8/1998 | Kanaba et al. | |
| 6,046,707 | A | 4/2000 | Gaughan et al. | |

(Continued)

FOREIGN PATENT DOCUMENTS

| | | | | |
|---|---|---|---|---|
| CN | 101359777 A * | 2/2009 | | H01Q 1/38 |
| EP | 0706231 A1 | 4/1996 | | |

OTHER PUBLICATIONS

Merriam-Webster Dictionary, Transverse Definition, Encyclopaedia Britannica Company, accessed online at http://www.merriam-webster.com/dictionary/transverse on Apr. 22, 2015.*

(Continued)

*Primary Examiner* — David Porta
*Assistant Examiner* — Jeremy S Valentiner
(74) *Attorney, Agent, or Firm* — Daly, Crowley, Mofford & Durkee, LLP

(57) ABSTRACT

An antenna array includes a plurality of antenna elements. The antenna elements include layers of dielectric material; an antenna inlaid in a top layer of the dielectric material so a surface of the antenna is substantially parallel to an outer surface of the top layer of dielectric material; and a conductive balun, coupled to the antenna, and embedded in one or more layers of the dielectric material. The antenna array is operative to receive signals from V to W frequency band transmissions generated by a heat source.

17 Claims, 10 Drawing Sheets

(56) References Cited

U.S. PATENT DOCUMENTS

| | | | | |
|---|---|---|---|---|
| 7,176,776 | B1 * | 2/2007 | Tantwai et al. | 336/200 |
| 8,264,410 | B1 | 9/2012 | Wang | |
| 8,265,410 | B1 | 9/2012 | Konoplev | |
| 8,390,529 | B1 | 3/2013 | Paulsen et al. | |
| 2005/0088252 | A1 * | 4/2005 | Burns et al. | 333/26 |
| 2008/0252393 | A1 * | 10/2008 | Kearns et al. | 333/26 |
| 2008/0258838 | A1 | 10/2008 | Oshima | |
| 2009/0009399 | A1 * | 1/2009 | Gaucher et al. | 343/700 MS |
| 2009/0179716 | A1 | 7/2009 | Gay | |
| 2009/0212879 | A1 * | 8/2009 | Rofougaran | 333/25 |
| 2010/0026412 | A1 * | 2/2010 | Kirkeby | 333/26 |
| 2012/0161870 | A1 * | 6/2012 | Leong | H01P 5/10 330/253 |
| 2012/0249374 | A1 * | 10/2012 | Wang | 343/700 MS |

OTHER PUBLICATIONS

Notification of Transmittal of the International Search Report and the Written Opinion of the International Searching Authority, or the Declaration, PCT/US2014/042698, Sep. 19, 2014, 1 page.

International Search Report, PCT/US2014/042698, Sep. 19, 2014, 5 pages.

Written Opinion of the International Searching Authority, PCT/US2014/042698, Sep. 19, 2014, 6 pages.

PCT International Preliminary Report on Patentability for PCT/US2014/042698 dated Jan. 7, 2016 2 pages.

PCT Written Opinion of the International Searching Authority for PCT/US2014/042698 dated Jan. 7, 2016 6 pages.

Taiwanese Office Action with English translation dated Dec. 22, 2015; For Taiwanese Pat. App. No. 103121367; 12 pages.

* cited by examiner

IMAGING ANTENNA AND RELATED TECHNIQUES

GOVERNMENT INTERESTS

The invention or inventions disclosed in this document were made with government support under contract number N68936-12-C-0114. The government has certain rights in the invention(s).

FIELD

Subject matter disclosed in this document relates to antenna systems and, more particularly, to antenna array elements for imaging systems.

BACKGROUND

Many modern imaging antenna applications require (broad) bandwidth in array antennas. In addition, many of these applications also require high isolation and low cross polarization between antenna elements. A further desirable quantity is for the elements of an array antenna to have coincident phase centers for different polarizations to reduce the need for complicated polarization calibrations. Imaging arrays present a significant challenge in material selection, apparatus design development of materials adaptation (Hints: dielectric layers), and manufacturing processes to manufacture the photonic detectors (pixels) array. It is also generally desirable that antenna designs be relatively easy and low cost to manufacture. Due to size and weight constraints in some applications, it may also be desirable that antennas be lightweight and relatively low-profile. Thus, there is a general need for antenna designs that are capable of providing some or all of these various attributes.

SUMMARY

In accordance with one aspect of the concepts, systems, circuits, and techniques described herein, an array antenna comprises a plurality of layers of dielectric material and a log-periodic toothed planar antenna. The planar antenna includes two substantially planar conductive sections, which are inlaid in a top layer of the dielectric material so a top surface of the planar sections is substantially perpendicular to an outer surface of the top layer of dielectric material. The antenna also includes a conductive balun, comprising at least two conductive sections, each of the conductive sections coupled to one of the planar sections of the antenna and embedded in one or more layers of the dielectric material. The balun extends through at least some of the layers of dielectric material in a direction substantially perpendicular to the planar conductive sections of the antenna. At least two conductive sections of the balun are arranged in an alternating staircase pattern.

In another embodiment, an imaging system comprises a two-dimensional array of antenna sections, each antenna section including a plurality of layers of dielectric materials and a log-periodic toothed planar antenna. The planar antenna includes two substantially planar conductive sections, which are inlaid in a top layer of the dielectric material so a top surface of the planar sections is substantially perpendicular to an outer surface of the top layer of dielectric material. The antenna also includes a conductive balun, comprising at least two conductive sections, each of the conductive sections coupled to one of the planar sections of the antenna and embedded in one or more layers of the dielectric material. The balun extends through at least some of the layers of dielectric material in a direction substantially perpendicular to the planar conductive sections of the antenna. At least two conductive section of the balun are arranged in an alternating staircase pattern.

BRIEF DESCRIPTION OF THE DRAWINGS

The foregoing features may be more fully understood from the following description of the drawings. The drawings illustrate exemplary embodiments and examples of the technology disclosed in this application. Therefore, the scope of the illustrations and drawings should not be construed to limit the scope of the disclosure, but rather, to provide examples of what is disclosed.

Like reference designators in the figures may denote like elements or similar elements.

DETAILED DESCRIPTION

Figure 1:
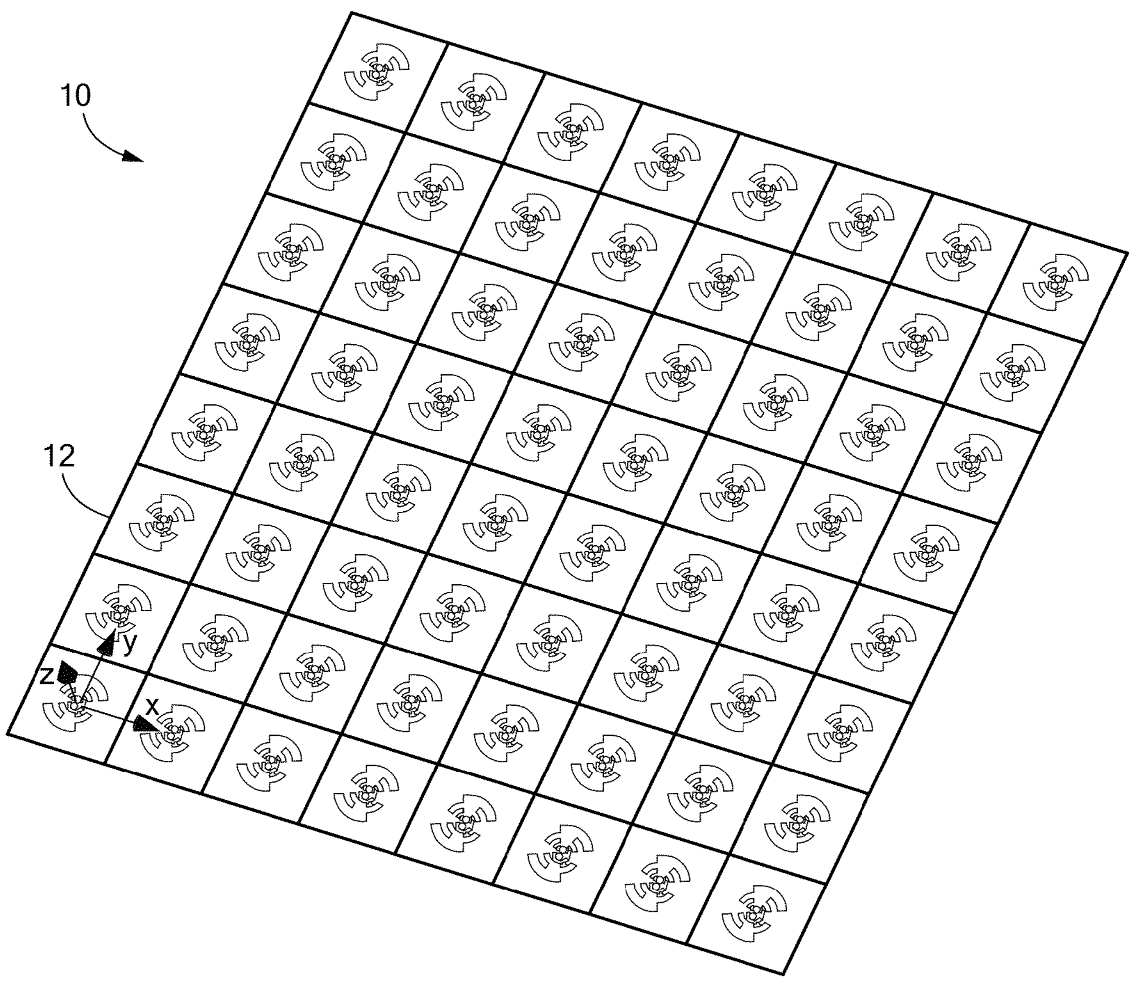
FIG. 1 is a diagram illustrating an exemplary imaging array antenna.

FIG. 1 is a diagram illustrating an embodiment of an array antenna 10. The array antenna 10 is capable of operation in multiple different polarizations with relative broad bandwidth. The array antenna 10 is also capable of operation with very low cross polarization between antenna elements 12. In embodiments, antenna elements 12 may be dual polarized by adding a second antenna element orthogonal to the antenna elements shown in FIG. 1.

Each antenna element may provide a pixel for use in an imaging system. The pixels provided by each antenna can be compiled and processed to form an image. The use of small or sub-compact antenna elements 12 increases the pixel density of the processed image. Thus, the array antenna 10 is well suited for imaging systems, for example, systems that receive electromagnetic radiation from randomly generated body heat and form an image of the source of the radiation.

In an embodiment, array antenna 10 comprises a layered substrate, which will be discussed below. The substrate may be a semiconductor substrate, such as a doped silicon die, or other substrate having layers of dielectric material. In embodiments, the substrate may be constructed so that different layers of the substrate have different dielectric properties.

The substrate may be sectioned into a two dimensional array of antenna elements 12, as shown in FIG. 1. In an embodiment, during manufacturing, antenna elements 12 may be formed in or on the substrate. In another embodiment, antenna elements 12 may be constructed individually and subsequently arranged into an array. Although shown as a two-dimensional array, the array of antenna elements may be a linear array, a series of linear arrays, a series of two-dimensional arrays, etc.

Figure 2:
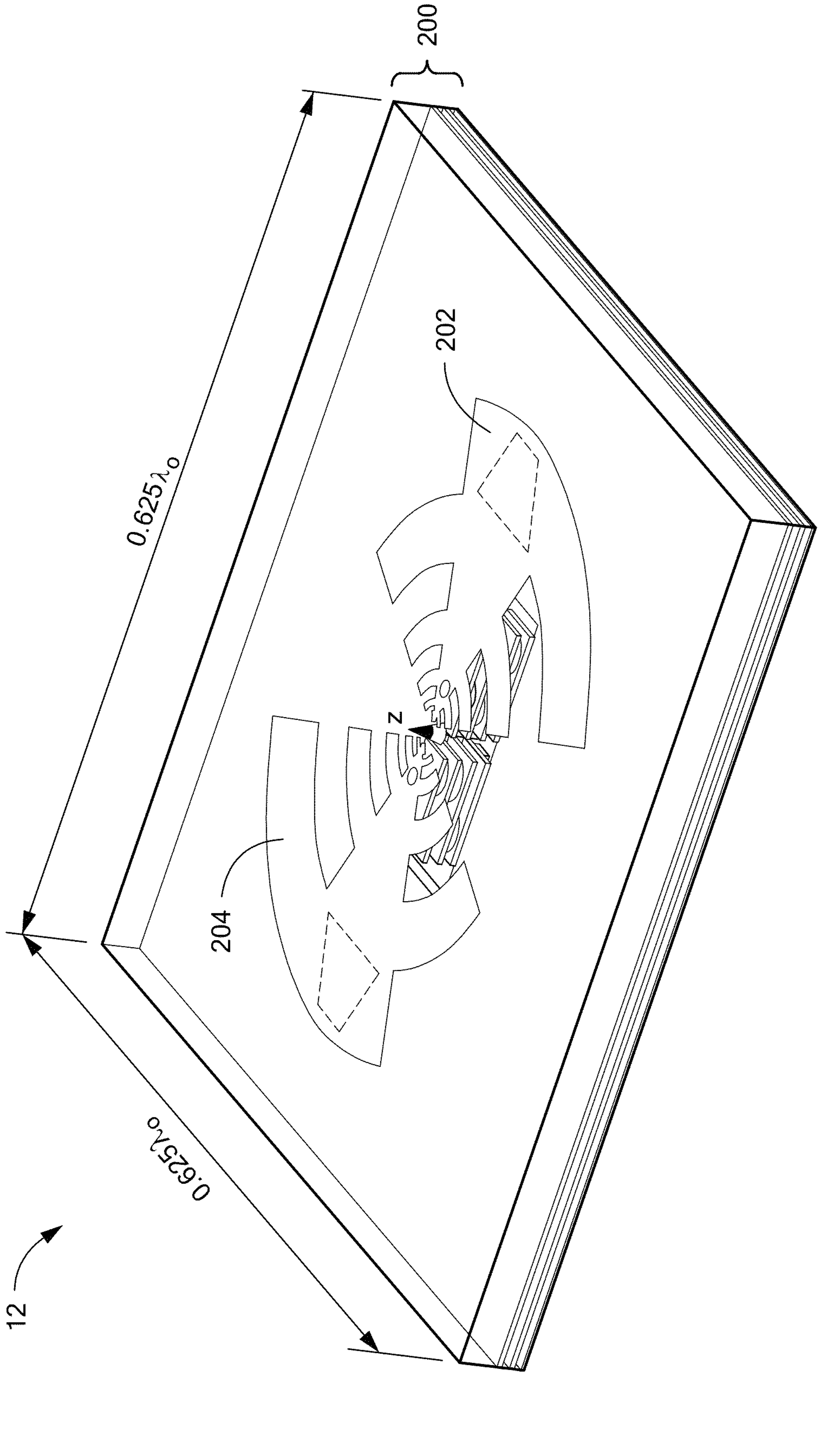
FIG. 2 is a perspective view of an exemplary antenna element.

FIG. 2 is an isometric diagram of an antenna component 12. In an embodiment, antenna component 12 is a sub-compact antenna. Antenna component 12 may have a square surface with a side length of $0.625\lambda_0$, where $\lambda_0$ is a wavelength of operation, i.e. a frequency to be received by antenna component 12. In an embodiment, antenna component 12 may be designed to receive signals having a frequency band where the center frequency has a wavelength of $\lambda_0$. In other embodiments, antenna component 12 has a rectangular, triangular, circular, or other shape.

Antenna component 12 may be designed to receive radiation in the microwave spectrum, for example, in the W band (i.e. 75 to 110 GHz), in the V band (i.e. 50 to 75 GHz), in the U band (i.e. 40 to 60 GHz), or in any other microwave frequency range. Using the W band as an example, if antenna component 12 is designed to receive W band signals, $\lambda_0$ may be chosen to be $11\times10^{-12}$ meters, which may roughly correlate to a center frequency of 90 GHz. $\lambda_0$ can also be chosen as any wavelength according to design requirements for antenna array 10 and/or antenna component 12, and according to a desired center frequency or frequency band to be received. In certain embodiments, $\lambda_0$ may be chosen as a wavelength in the W band, and the resulting antenna component 12 may be able to successfully receive signals in other bands, such as the V band, the U band, the F band, the D band, etc.

As shown in FIG. 2, antenna component 12 includes a substrate 200 and one or more antenna elements 202, 204. The antenna elements 202 and 204 may be formed from a conductive material such as copper, and may form a logarithm planar antenna that creates a differential signal representing the microwave signals received by the antenna elements 202 and 204. In an embodiment, antenna elements 202 and 204 may form a dipole antenna. Antenna elements 202 and 204 may also be formed from other conductive materials including, but not limited to, metals, ceramics, electrolytes, carbon or graphite based material, conductive polymers, and the like.

Figures 3A, 3B:
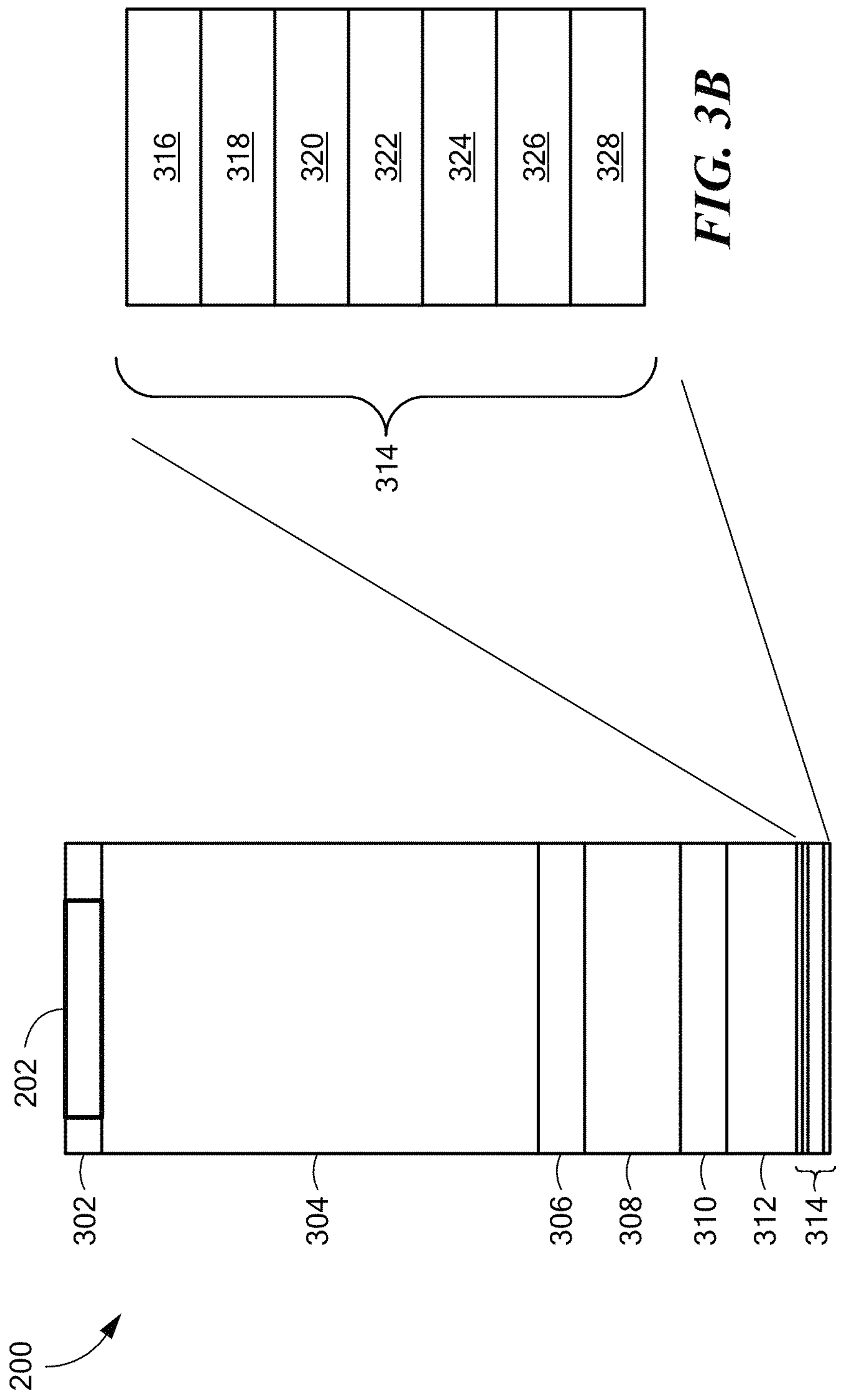
FIG. 3A is a cross sectional view of an antenna element.
FIG. 3B is a cross sectional view of a multilayered section of the substrate.

FIG. 3A is a cross section of substrate 200 showing multiple layers of material. Substrate 200 includes a first layer 302 of dielectric material in which antenna elements 202 (and/or 204) may reside. In an embodiment, first layer 302 may form the top surface of antenna component 12 and antenna array 10. Antenna elements 202 and 204 may be embedded or inlaid within first layer 302 so that the surface of antenna elements 202 and 204 is flush with the outer surface of first layer 302. Although shown as having the same thickness, antenna elements 202 and 204 may have a thickness greater or smaller than that of first layer 302. If the antenna elements have a smaller thickness, the antenna elements may not extend all the way through first layer 302, and if the antenna elements have a greater thickness, the antenna elements may extend through the first layer 302 into the second layer 304.

In an embodiment, first layer 302 and second layer 304 comprise a dielectric epoxy material. The material may have a dielectric constant of about 2.9 and a loss tangent of about 0.04. During manufacturing, layer 304 may be formed on substrate 200. Subsequently antenna elements 202 and 204 may be masked and/or etched (or otherwise formed) onto the surface of layer 304. Once antenna elements 202 and 204 are formed, layer 302 of dielectric material may be deposited on top of layer 304 in the areas not covered by antenna elements 202 and 204. Alternatively, the dielectric material of layer 302 may be deposited onto the surface of substrate 200 so that layer 302 covers both layer 304 and the antenna elements. In an embodiment, material may then be removed from the top surface of substrate 200 until antenna elements 202 and 204 are exposed and the surface of antenna element 202 and antenna element 204 is flush or parallel with the surface of layer 302. However, removal of the material to expose antenna elements 202 and 204 is not a requirement.

Layers 302, 304, 308, and 312 may comprise the same or a similar dielectric epoxy. As noted above, the dielectric epoxy in layers 302, 304, 308, and 312 may have a dielectric constant of about 2.9 and a loss tangent of about 0.04. These constants are provided as examples only; the material in layers 302, 304, 308, and 312 may have other dielectric constants and loss tangents as desired. Also, layers 302, 304, 308, and 312 may be formed from different dielectric materials if desired.

Layers 306 and 310 are conductive layers. For example, layers 306 and 310 may be copper, aluminum, gold, or any other type of conductive material. In an embodiment, layers 306 and 310 are electrically connected to a ground reference and act as ground planes for the antenna array 10.

Reference designator 314 denotes a multi-layered section of substrate 200. These layers in section 314 may be relatively thinner than layers 302, 304, 306, 308, 310, and/or 312. Accordingly, these layers 314 are broken out and enlarged in FIG. 3B.

As shown in FIG. 3B, substrate 200 includes layers 316, 318, 320, 322, 324, 326, and/or 328. Layer 316, in an embodiment, may be a dielectric material such as a polyimide, and may have a dielectric constant of 6.5 and a loss tangent of 0.01. Layers 318-328 may also be dielectric materials such as silicon dioxide, doped silicon dioxide, other silicon dioxide composites, glass, glassy carbon, or other materials having desired dielectric properties. In an embodiment, the layers of substrate 200 have properties according to the following table:

| Layer (Reference Designator) | Material | Dielectric Constant | Loss Tangent | Thickness (in $\lambda_0$) |
|---|---|---|---|---|
| 302 | Dielectric Epoxy | 2.9 | 0.04 | 0.002 |
| 304 | Dielectric Epoxy | 2.9 | 0.04 | 0.028 |
| 306 | Copper (Conductor) | | | 0.003 |
| 308 | Dielectric Epoxy | 2.9 | 0.04 | 0.006 |
| 310 | Copper (Conductor) | | | 0.003 |
| 312 | Dielectric Epoxy | 2.9 | 0.04 | 0.004 |
| 316 | Dielectric Polyimide | 6.5 | 0.01 | 0.0001 |
| 318 | Dielectric | 4.2 | 0.01 | 0.0002 |
| 320 | Dielectric | 6.5 | 0.01 | 0.0002 |
| 322 | Dielectric | 4.4 | 0.01 | 0.0002 |
| 324 | Dielectric | 3.9 | 0.03 | 0.001 |
| 326 | Dielectric | 4.2 | 0.01 | 0.0003 |
| 328 | Dielectric | 3.9 | 0.01 | 0.0001 |

The table above illustrates an exemplary embodiment of the layers in substrate 200, and is not intended to limit the scope of the disclosure. The layers above can be removed, replaced, or modified with material having different properties as required by design requirements.

Figure 4B:
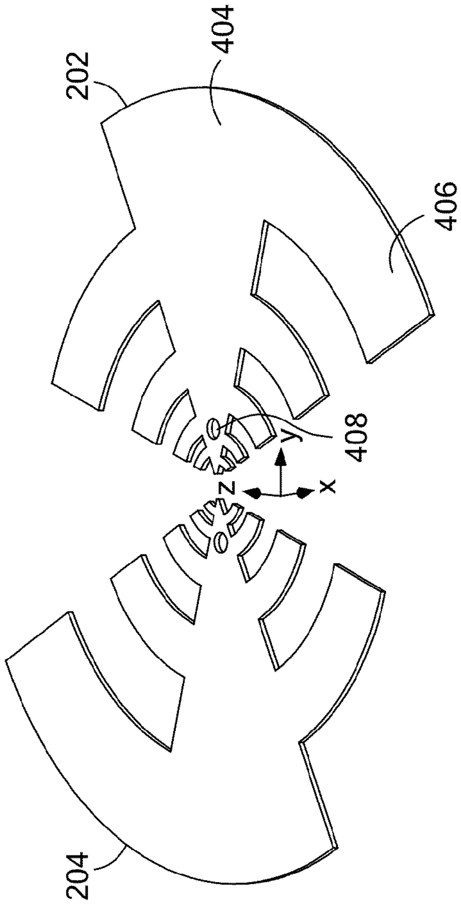
FIG. 4A, FIG. 4B, and FIG. 4C are illustrations of a conductive element of an antenna.
Figure 4C:
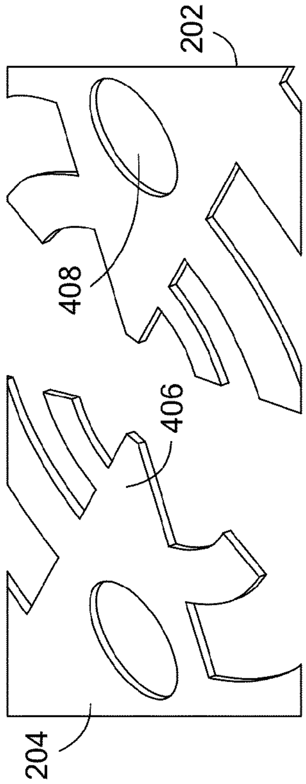
Figure 4A:
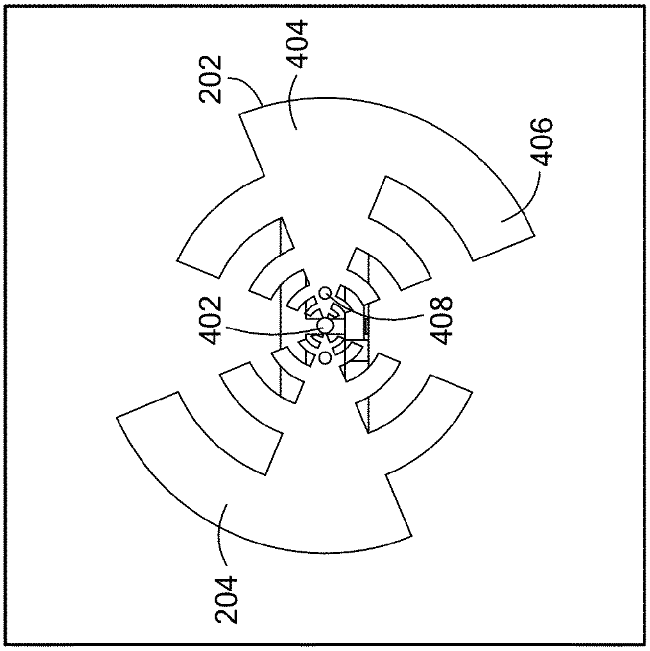

FIGS. 4A, 4B, and 4C are illustrations of antenna elements 202 and 204. Antenna elements 202 and 204 may be a type of log-periodic toothed planar antenna. As noted above, each antenna component 12 within antenna array 10 may include one more antenna elements 202 and/or 204. As described above, antenna elements 202 and 204 may comprise a conductive material such as copper. Antenna elements 202 and 204 may be substantially flat, i.e. planar, and may be inlaid or embedded in first layer 302 of dielectric material.

Antenna elements 202 and 204 may comprise a log-periodic toothed planar array antenna, where antenna element 202 is one side of the log periodic planar antenna and antenna element 204 is the other side of the log periodic planar antenna. In an embodiment, antenna element 202 has a central body 404 with a roughly triangular shape, with a point or apex of the triangle terminating at or near a central point 402. Extending from the central body 404 are a series of teeth or leaves 406. The leaves 406 extend from the body 404 and have a curvature or radius relative to central point 402. The leaves 406 closest to central point 402 may be relatively smaller in width and length, and the leaves 406 further from central point 402 may increase in width and length the further they are from central point 402. As shown, the leaves 406 extend from the body 404 in an alternating pattern relative to their distance from central point 402. In other words, as body 404 extends radially from central point 402, leaves 406 extend first from one side of body 404 then on the other side, etc., so that the leaves 406 alternate sides.

In an embodiment, the leaves 406 of the antenna may approximate the shape of a spiral planar antenna. However, leaves 406 need not form a spiral. For example, the curvature of leaves 406 may follow a spiral pattern. In other embodiments, leaves 406 may have a circular, elliptical, semi-circular, or arced pattern, as shown in FIGS. 4A-4C.

In an embodiment, antenna elements 202 and 204 may each have four leaves 406 on one side of body 404 and five leaves on the other side of body 404. However, this is not a requirement. Antenna elements 202 and 204 can have more or fewer leaves 406 on each side of body 404. The leaves 406 may increase in length and thickness as they increase in distance from central point 402.

Antenna element 202 may also include a hole 408. As shown in FIGS. 4A, 4B, and 4C, hole 408 is positioned relatively close to the center point 402. Hole 408 may have a diameter sufficiently large to allow a portion of a balun structure to extend through hole 408 and sufficiently small so that the inner surface of hole 408 makes electrical contact with the balun.

Antenna elements 202 and 204 may be radially symmetric, i.e. antenna element 202 and antenna element 204 may be identical about the central point 402. Accordingly, antenna element 204 may include at least all the features described above with respect to antenna element 204 including, but not limited to, body 404, leaves 406, and hole 408.

Figure 5A:
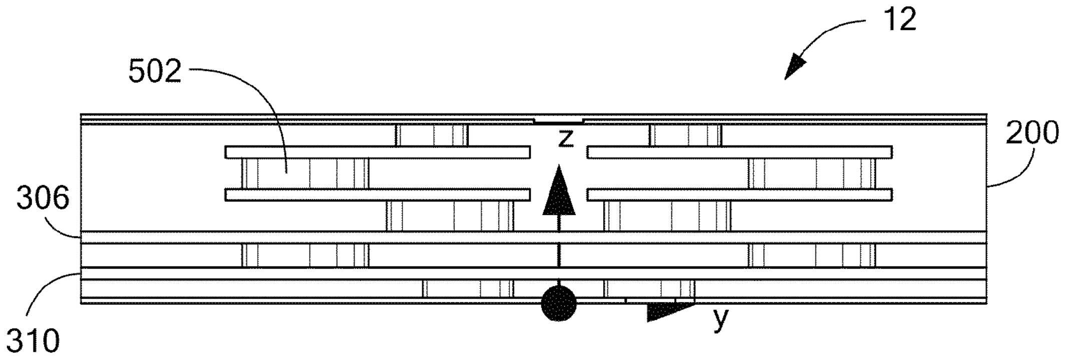
FIG. 5A, FIG. 5B, and FIG. 5C are illustrations of a balun element of an antenna.
Figure 5B:
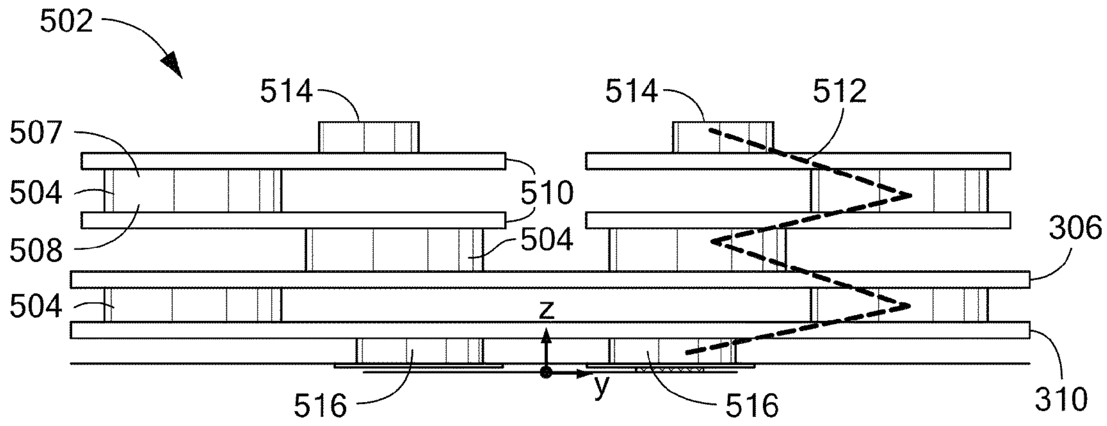
Figure 5C:
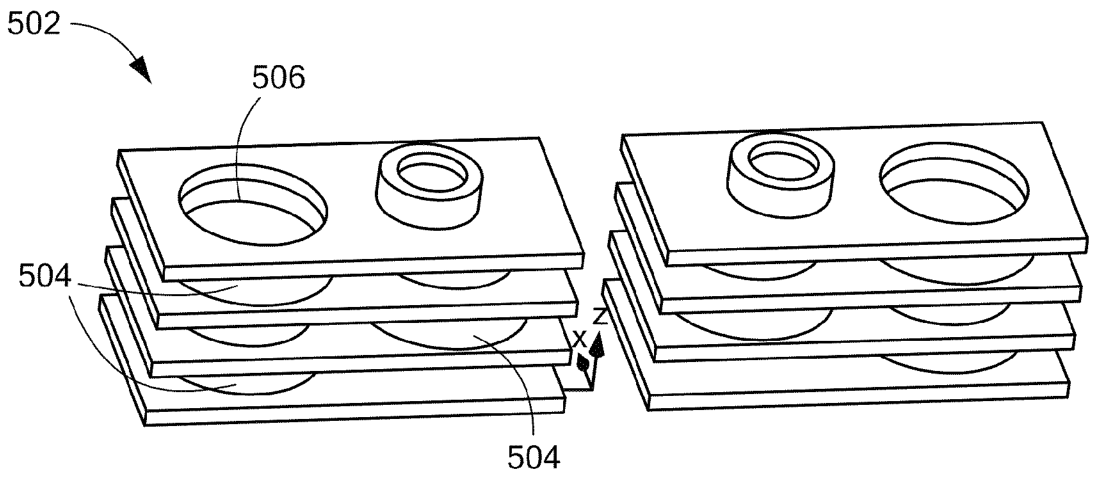

FIGS. 5A, 5B illustrate a cross section of a balun 502 included in antenna component 12. FIG. 5A shows balun 502 embedded within the substrate of antenna component 12, FIG. 5B shows balun 502 apart from the substrate of antenna component 12, and FIG. 5C shows an isometric view of balun 502. Balun 502 may comprise a conductive material such as copper. In embodiments, balun 502 is formed from the same material as antenna elements 202 and/or 204. However, this is not a requirement.

Balun 502 extends through substrate 200 substantially perpendicularly to antenna elements 202 and 204. By extending balun 500 down through the substrate, antenna component 12 can be constructed in a sub-compact arrangement because the area and volume used by antenna elements 202 and 104, and balun 502, is reduced.

Balun 502, when electrically connected to antenna element 202 and antenna element 204, may act to extend the electrical length of antenna element 202 and antenna element 204 so that the antenna length is a multiple of a quarter wavelength of the intended frequency to be received by antenna component 12, i.e. so that the electrical length is the same as or similar to $\lambda_0/4$, $\lambda_0/2$, $\lambda_0$, etc. However, this is not a requirement. For example, the electrical length of the antenna may be a quarter wavelength at a high frequency, but may be less than a quarter wavelength for slower frequencies, which can also be received by the antenna. This is due, at least in part, to the balun 502 being embedded in the layers of dielectric material, which effectively increases the electrical length of the balun 502.

Balun 502 acts to electrically extend the length of the antenna by affecting the impedance, capacitance, resistance, and other electrical properties of the antenna. As described previously, balun 502 may be embedded within dielectric layers of substrate 200. Also, dielectric material may fill voids within balun 502, as shown in FIG. 5C. The geometry of balun 502 through the substrate material may allow balun 502 to affect the impedance and capacitance of the antenna to effectively extend the electrical length of the antenna.

The electrical length of the antenna and/or the balun may be less than a quarter-wavelength of the intended frequency. As is known, extending the electrical length of the antenna can aid in reception of the intended frequencies by the antenna. In an embodiment, the electrical length of the antenna and/or the balun may be less than a quarter wavelength of the intended frequency. For example, the dielectric material in which balun 502 is embedded, and which fills voids within balun 502, imparts electrical properties on balun 502 making balun appear (i.e. act) as though it is electrically longer than its physical dimensions.

As shown in FIG. 5A, balun 502 may extend through multiple layers of substrate 200. In embodiments, balun 502 is embedded within the dielectric epoxy material of layers 302, 304, 308 and 312 (See FIG. 3A). In certain embodiments, balun 502 may also be embedded in or extend through layers 316-328 (See FIG. 3B).

Figure 6:
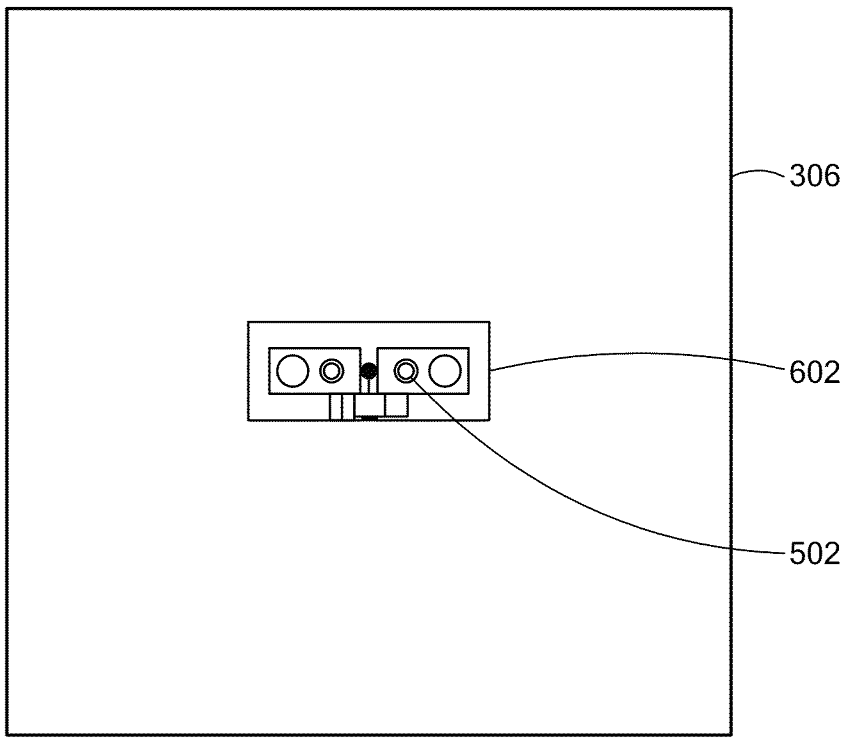
FIG. 6 is an illustration of a ground plane having one or more holes.

Balun 502 may also pass through conductive layers 306 and 310. As such, conductive layers 306 and 310 may contain one or more holes through which balun 502 can extend so that balun 502 does not make direct electrical contact with layers 306 and 310, which may be coupled to ground. Referring briefly to FIG. 6, a conductive layer 306 (or a similar layer) is shown from a top view. Conductive layer 306 (and/or conductive layer 310) includes one or more holes 602 through which balun 502 can extend so that balun 502 does not come in direction contact with conductive layer 306 (and/or conductive layer 310).

Referring again to FIGS. 5B and 5C, balun 502 comprises a series of annular sections 504. Annular sections 504 may be substantially cylindrical conductive elements having a hollow core 506, as seen in FIG. 5C. In embodiments, the hollow core 506 may be filled with a dielectric material, which may be the same as or similar to the dielectric epoxy comprising the layers of substrate 200. The annular sections may all have the same diameter, or may have differing diameters as desired.

Annular sections 504 may each have a top end 507 and a bottom end 508 coupled to a substantially planar conductive element 510. Annular sections 504 and conductive elements 510 are connected to form a transverse pattern where annular sections 504 are placed in alternating positions with respect to conductive elements 510. This so-called alternating staircase pattern forms a substantially alternating or zigzag conduction path as shown by line 512. This allows balun 502 to provide a sufficiently long conduction path 512 for antenna component 12 to receive microwave signals while conserving the amount of area and/or volume used by balun 502 within substrate 200.

Although shown as having three annular sections 504 on each side of the balun 502, balun 502 may include more or fewer than three annular sections (and thus more or fewer conductive elements 510) as desired. Reducing the number of annular sections 504 may reduce the electrical length of balun 502 and increasing the number of annular sections 504 may increase the electrical length of balun 502.

Figure 7A:
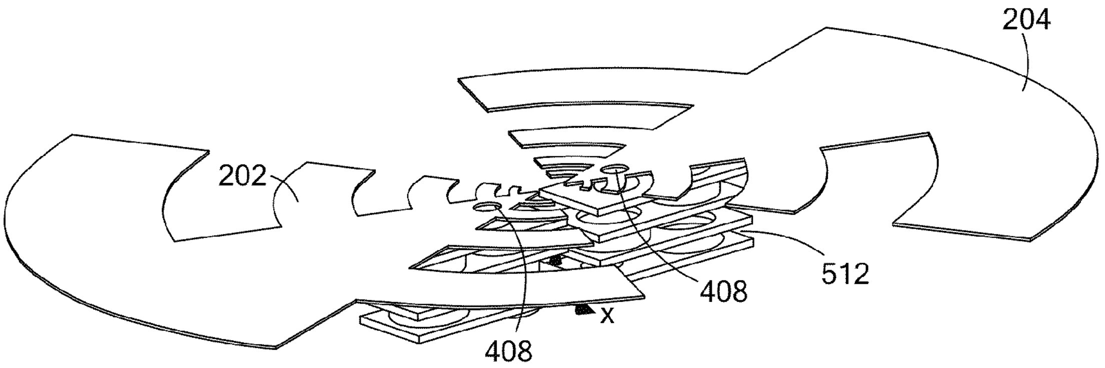
FIG. 7A and FIG. 7B are diagrams of a conductive element of an antenna coupled to a balun.
Figure 7B:
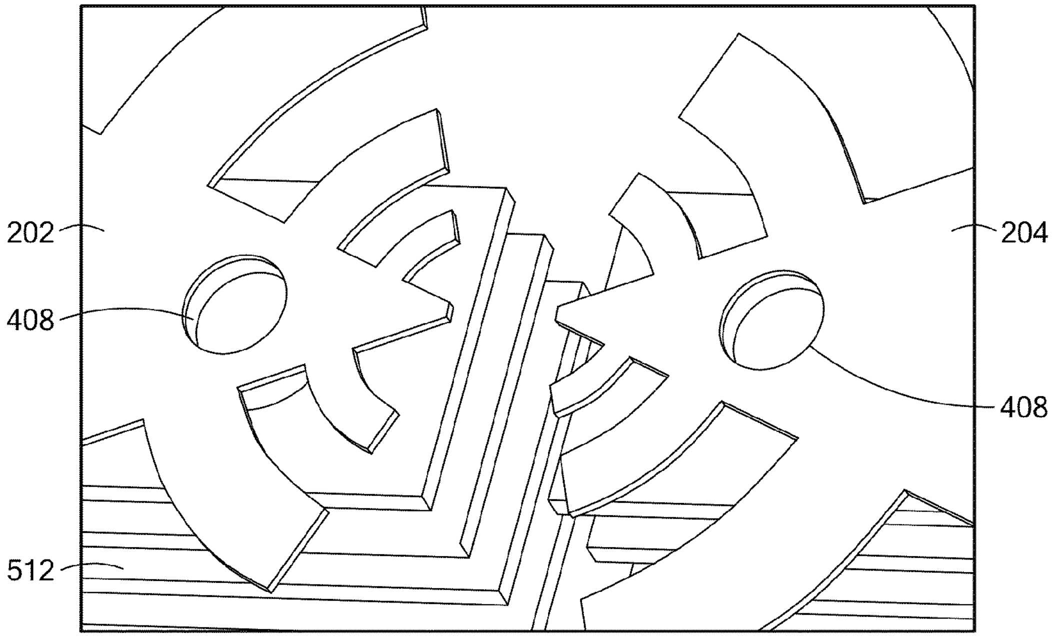

Balun 502 also includes one or more antenna connectors 514 that electrically couple balun 502 to antenna elements 202 and 204. Antenna connectors 514 may extend through the holes 408 in the antenna elements 202 and 204, as shown in FIGS. 7A and 7B. Accordingly, antenna connectors 514 may have a diameter sufficiently large so that the outer surface of connectors 514 comes in electrical contact with the inner surface of holes 408.

Antenna connectors 514 may be annular connectors with a substantially cylindrical shape, and may have a hollow core 506. The hollow core 506 may be filled with a dielectric material similar to or the same as the dielectric material used in one or more of the layers of substrate 200. In an embodiment, the diameter of the connectors 514 and holes 408 may be smaller than the diameter of annular sections 504. However, this is not a requirement. In other embodiments, the diameter of connectors 514 and holes 408 may be the same as or greater than the diameters of annular sections 504.

Referring again to FIG. 5B, balun 502 may also comprise one or more terminal connectors 516. Terminal connectors 516 may also be substantially cylindrical annular sections having a hollow core (not shown) filled with dielectric material. The dielectric material may be similar to or the same as the dielectric material comprising one or more layers of substrate 200.

In embodiments, terminal connectors 516 are coupled to external circuitry capable of receiving signals from antenna component 12. For example, terminal connectors 516 may be coupled to an amplifier, a filter, a processor, or another circuit capable of receiving and processing signals coupled by antenna component 12 as antenna component 12 receives microwave transmissions and signals. In an embodiment, terminal connectors 516 extend through the bottom substrate 200 so that external, electrical connections can be made to terminal connectors 516. In another embodiment, terminal connectors 516 are embedded within substrate 200 and are coupled to connectors that extend externally to substrate 200.

Figure 8:
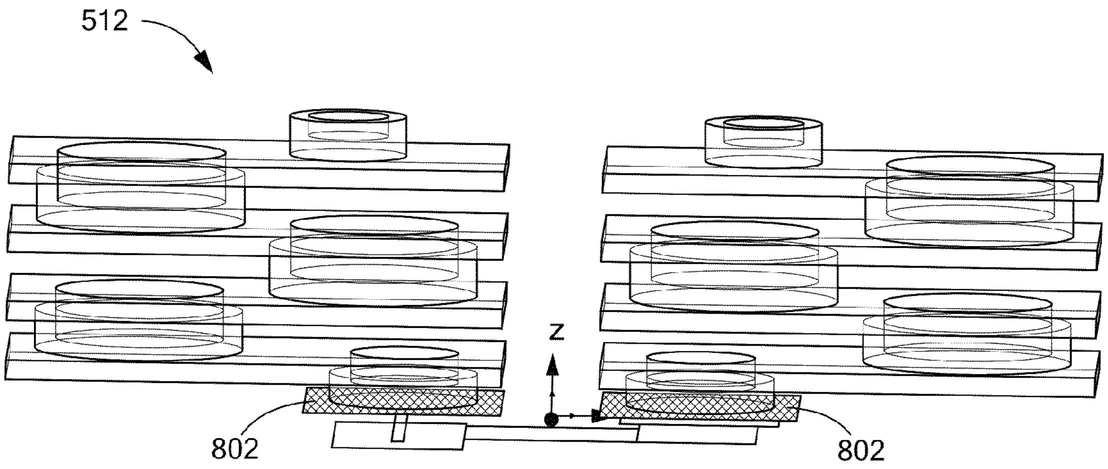
FIG. 8 is an illustration of contact pads coupled to a balun.

For example, turning to the embodiment illustrated in FIG. 8, terminal connectors 516 are coupled to connection pads 802. Connection pads 802 may be placed on or proximate to the bottom of substrate 200 so that they come in contact with the portion of terminal connectors 516 that extend through substrate 200. Alternatively, connection pads 802 may be embedded within the material of substrate 200. Connection pads 802 may be made from a conductor, such as copper or gold, to facilitate electrical connection between balun 502 and external circuitry.

Figure 9:
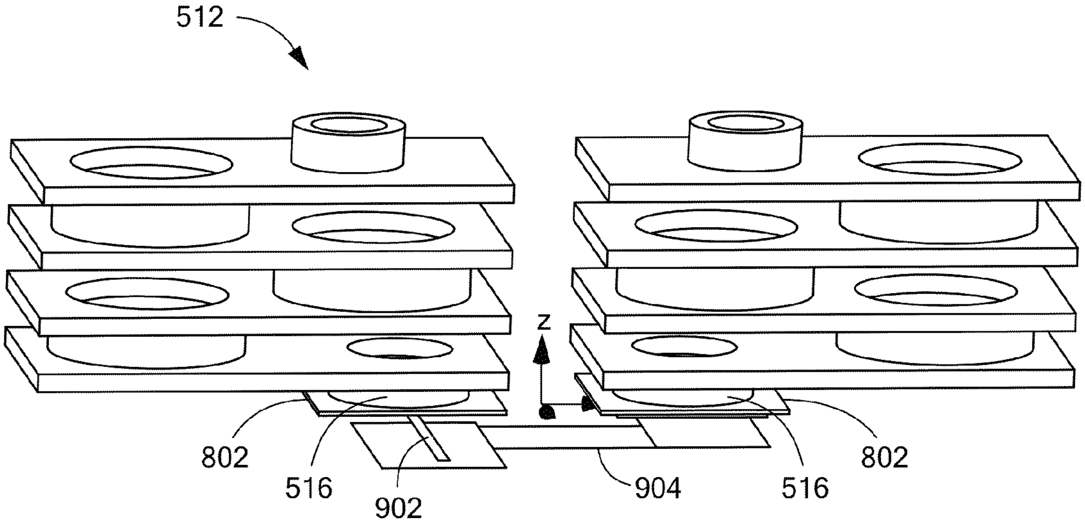
FIG. 9 is an illustration of contact pads and an impedance transformer coupled to a balun.

Connection pads 802 may be coupled to a signal lead, such as signal lead 902 in FIG. 9. Signal lead 902 can extend externally to substrate 200 and can be connected to external circuitry that receives and processes the signal received by the antenna. In an embodiment, signal lead 902 is coupled to an external low noise amplifier (LNA) and/or filter that receives the signal from antenna component 12. Although not shown, a signal lead may be coupled to and extend from each connection pad 802.

A conductor 904 may be positioned adjacent to the signal leads 902. In an embodiment, conductor 904 may be positioned below signal leads 902. Conductor 904 may be coupled to a ground reference so that conductor 904 acts as a ground plane to enhance signal quality of the signals on signal leads 902. Additionally/alternatively, conductor 904 may act as an impedance transformer to match the impedance of the signal paths of the antenna to external circuitry connections.

Figure 10A:
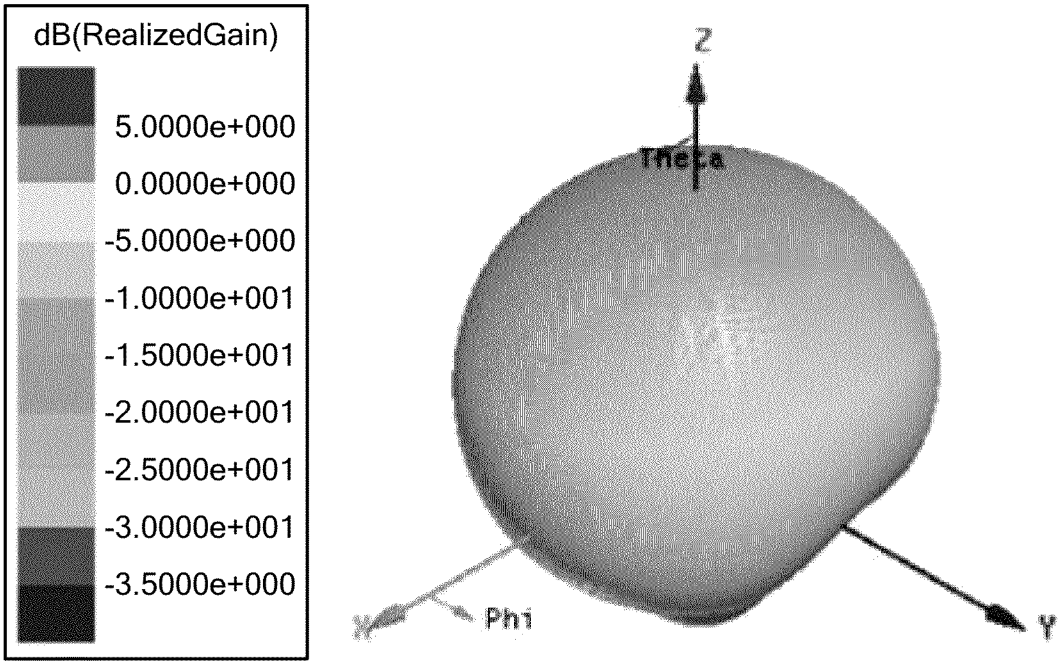
FIG. 10A, FIG. 10B, FIG. 10C, and FIG. 10D are graphs showing performance of an exemplary embodiment of an antenna.
Figure 10B:
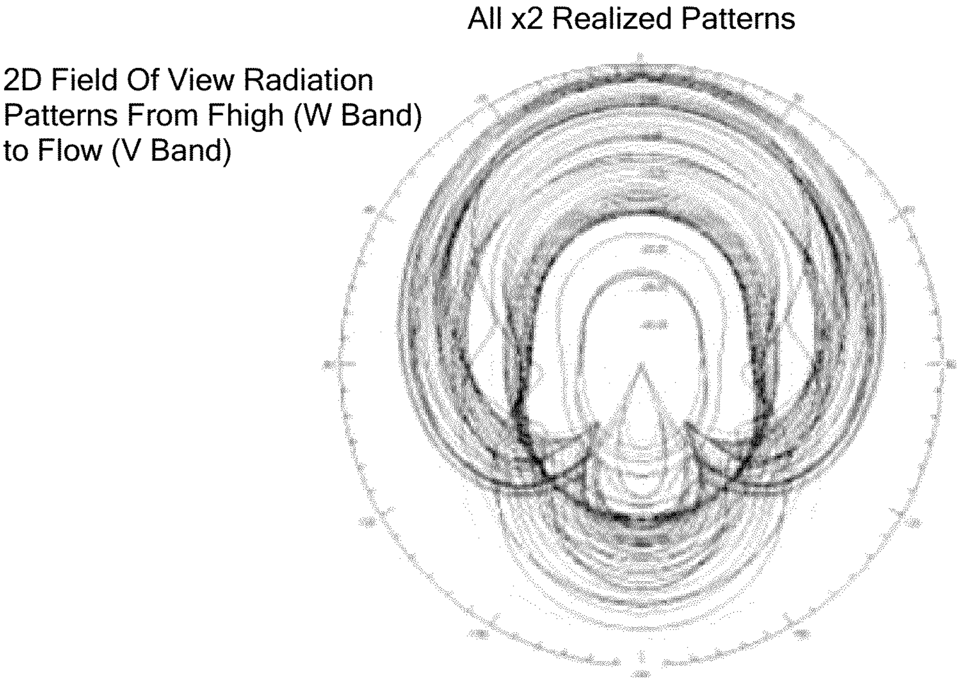
Figure 10C:
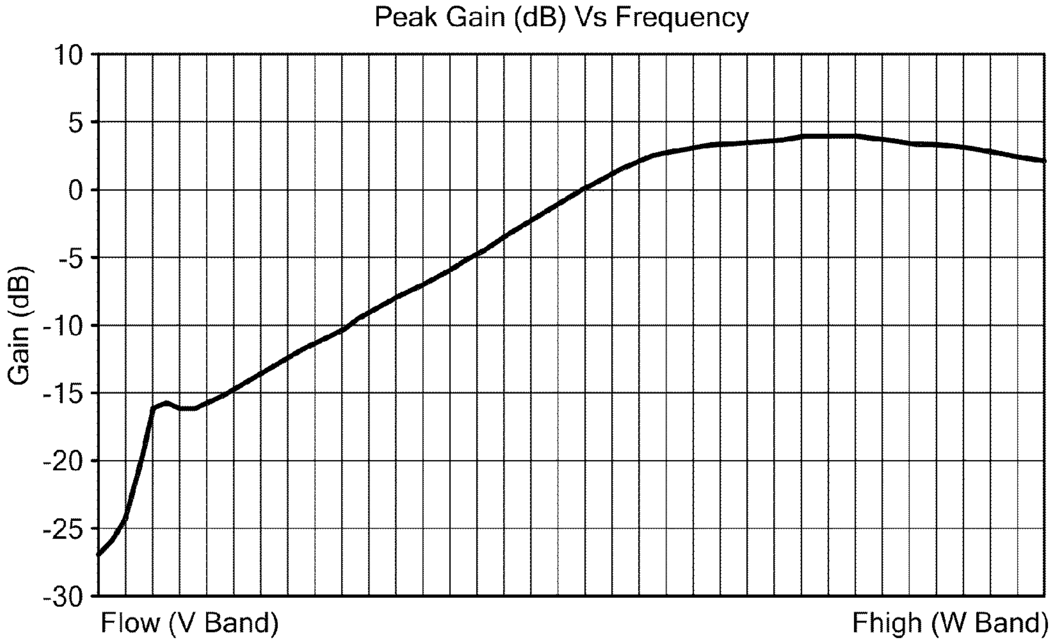
Figure 10D:
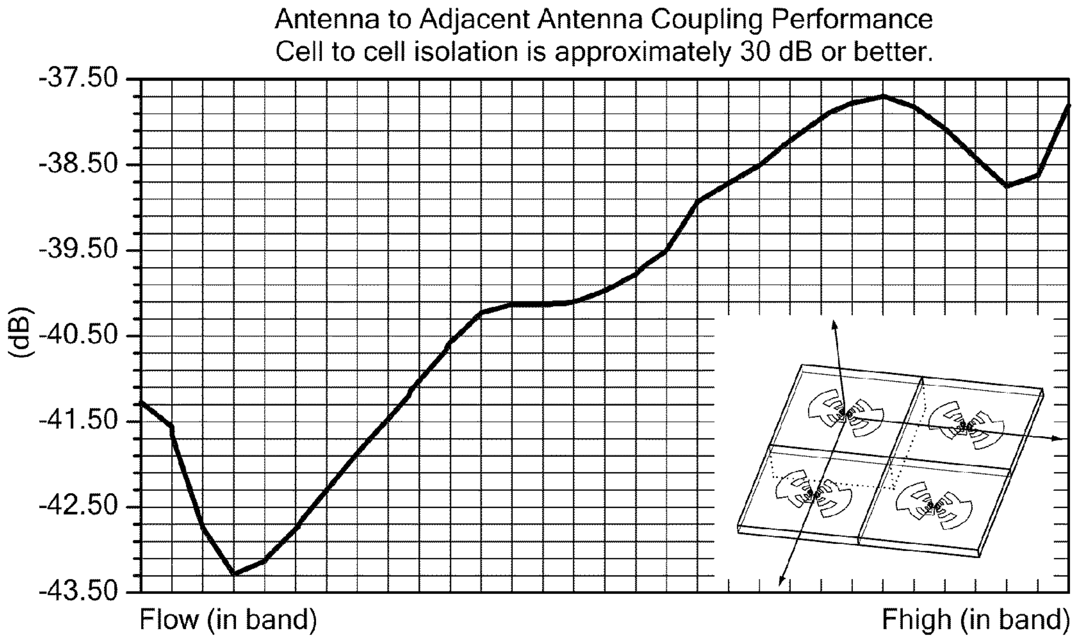

FIGS. 10A, 10B, 10C, and 10D are graphs showing performance of an exemplary embodiment of the antenna described above. FIG. 10A is a 3D plot showing field of view and realized gain at a frequency $\lambda_0$. FIG. 10B is a 2D field of view and realized gain from including frequencies in the W band and the V band. FIG. 10C is a graph of the peak gain of a signal received by the antenna v. frequency. In FIG. 10C, the vertical axis represents gain and the horizontal axis represents the frequency. The frequency on the horizontal axis ranges from a low in-band frequency to a high in-band frequency. FIG. 10D is a graph showing isolation performance between four adjacently placed antenna components 12. In FIG. 10D, the vertical axis represents decibels (where the top of the vertical axis is −30 dB) and the horizontal axis represents frequencies ranging from a low in-band frequency to a high in-band frequency.

Referring again to FIG. 1 and FIG. 2, an antenna component 12 may be used to receive microwave transmissions or signals. Antenna component 12 may be used as a single (i.e. stand-alone) element, or may be incorporated into an antenna array 10. In operation, antenna array 10 may receive multiple microwave transmissions. In other words, each antenna component 12 within antenna array 10 may receive a separate microwave transmission. When used in antenna array 10, each antenna component 12 represents photonic detector and the signal produced by each antenna component 12 represents a pixel that can be subsequently processed and reconstructed to form a two dimensional image of the original signal source. In an embodiment, the original signal source is a body that generates random heat, (i.e. a randomly generated heat source.) Antenna component 12 and antenna array 10 may be useful in various application including imaging, missile guidance, targeting, surveillance, etc.

In the description above, various features, techniques, and concepts are described in the context of an imaging antenna array and antenna components. It should be appreciated, however, that these features are not limited to use within an imaging array. That is, most of the described features may be implemented in any type of antenna application.

Having described exemplary embodiments of the invention, it will now become apparent to one of ordinary skill in the art that other embodiments incorporating their concepts may also be used. The embodiments contained herein should not be limited to the disclosed embodiments, but rather should be limited only by the spirit and scope of the appended claims. All publications and references cited herein are expressly incorporated herein by reference in their entirety.

What is claimed is:

1. A sub-compact antenna apparatus comprising: a plurality of layers of dielectric material;

an antenna inlaid in a top layer of the dielectric material so a surface of the antenna is substantially parallel to an outer surface of the top layer of dielectric material; and a conductive staircase balun, coupled to the antenna, and embedded in one or more layers of the dielectric material, the conductive staircase balun comprising alternating layers of planar segments and annular segments, wherein first and second ones of the annular segments are placed in an alternating position with respect to the planar segment positioned between the first annular segment and the second annular segment;

wherein the antenna includes a hole and the balun comprises a cylindrical section adapted to extend through the hole to couple the antenna to the balun, and wherein a geometry of the balun within the layers of the dielectric material electrically extends a length of the antenna.

2. The apparatus of claim 1 further comprising at least one conductive layer between the layers of dielectric material.

3. The apparatus of claim 2 wherein the at least one conductive layer contains the hole through which the balun extends.

4. The apparatus of claim 2 wherein the at least one conductive layer is a ground layer.

5. The apparatus of claim 1 wherein the plurality of layers of dielectric material includes eleven layers of dielectric material.

6. The apparatus of claim 5 further comprising a conductive layer between the second and third layers of dielectric material, and a conductive layer between the third and fourth layers of dielectric material.

7. The apparatus of claim 1 wherein the antenna is a planar antenna.

8. The apparatus of claim 1 wherein the antenna is configured to receive signals in the W band, the V hand, or both.

9. The apparatus of claim 1 wherein the antenna is a log-periodic toothed antenna.

10. The apparatus of claim 9 wherein the log-periodic toothed antenna comprises radially symmetric sections.

11. The apparatus of claim 1 wherein the balun is embedded in and extends through at least a portion of the plurality of layers in a direction substantially perpendicular to the antenna.

12. The apparatus of claim 1 wherein a cavity of the annular segments is filled with dielectric material.

13. The apparatus of claim 1 further comprising an impedance transformer coupled to receive an electrical signal from the balun.

14. The apparatus of claim 1 wherein the surface of the antenna is flush with the surface of the top layer.

15. An apparatus comprising:

a plurality of layers of dielectric material;

a log-periodic toothed planar antenna comprising two substantially planar conductive sections, the conductive sections inlaid in a top layer of the dielectric material so a top surface of the planar sections is substantially perpendicular to an outer surface of the top layer of dielectric material; and a conductive balun, comprising at least two conductive sections, each of the conductive sections coupled to one of the planar sections of the antenna, and embedded in one or more layers of the dielectric material, wherein the balun extends through at least some of the layers of dielectric material in a direction substantially perpendicular to the planar conductive sections of the antenna, the conductive balun comprising alternating layers of planar segments and annular segments arranged in an alternating staircase pattern, wherein first and second ones of the annular segments are placed in an alternating position with respect to the planar segment positioned between the first annular segment and the second annular segment;

wherein the antenna includes a hole and the balun comprises a cylindrical section adapted to extend through the hole to couple the antenna to the balun, and wherein a geometry of the balun within the layers of the dielectric material electrically extends a length of the antenna.

16. An imaging system comprising:

a two-dimensional array of antenna sections, each antenna section comprising:

a plurality of layers of dielectric material:

a log-periodic toothed planar antenna comprising two substantially planar conductive sections, the conductive sections inlaid in a top layer of the dielectric material so a top surface of the planar sections is substantially perpendicular to an outer surface of the top layer of dielectric material; and a conductive balun, comprising at least two conductive sections, each of the conductive sections coupled to one of the planar sections of the antenna, and embedded in one or more layers of the dielectric material, the conductive staircase balun comprising alternating layers of planar segments and annular segments, wherein first and second ones of the annular segments are placed in an alternating position with respect to the planar segment positioned between the first annular segment and the second annular segment;

wherein the antenna includes a hole and the balun comprises a cylindrical section adapted to extend through the hole to couple the antenna to the balun, and wherein a geometry of the balun within the layers of the dielectric material electrically extends a length of the antenna.

17. The apparatus of claim 1, wherein adjacent ones of the annular segments do not overlap with each other.

* * * * *